US012625613B2

(12) United States Patent
Benisty et al.

(10) Patent No.: US 12,625,613 B2
(45) Date of Patent: May 12, 2026

(54) CONTINUOUS NAND DATA-TRANSFER WITH DYNAMIC TM

(71) Applicant: Sandisk Technologies, Inc., Milpitas, CA (US)

(72) Inventors: Shay Benisty, Beer Sheva (IL); Yossi Yoseph Hassan, Nechusha, IL (US)

(73) Assignee: Sandisk Technologies, Inc., San Jose, CA (US)

( * ) Notice: Subject to any disclaimer, the term of this patent is extended or adjusted under 35 U.S.C. 154(b) by 24 days.

(21) Appl. No.: 17/965,168

(22) Filed: Oct. 13, 2022

(65) Prior Publication Data

US 2023/0105936 A1     Apr. 6, 2023

Related U.S. Application Data

(63) Continuation-in-part of application No. 17/492,175, filed on Oct. 1, 2021, now Pat. No. 11,755,238.

(51) Int. Cl.
| | |
|---|---|
| *G06F 3/06* | (2006.01) |
| *G11C 7/10* | (2006.01) |
| *G11C 16/26* | (2006.01) |
| *G11C 16/32* | (2006.01) |

(52) U.S. Cl.
CPC .......... *G06F 3/0611* (2013.01); *G06F 3/0629* (2013.01); *G06F 3/0679* (2013.01)

(58) Field of Classification Search
CPC ................................. G06F 5/14; G06F 13/126
See application file for complete search history.

(56) References Cited

U.S. PATENT DOCUMENTS

| | | | |
|---|---|---|---|
| 7,836,273 B1 | 11/2010 | Norman | |
| 8,386,737 B2 | 2/2013 | Jeon et al. | |
| 9,658,822 B1 * | 5/2017 | O'Connor | G06F 5/14 |
| 9,773,530 B1 * | 9/2017 | Cho | G11C 7/1084 |
| 9,996,486 B2 | 6/2018 | Zehavi et al. | |
| 10,198,383 B2 | 2/2019 | Zehavi et al. | |
| 10,592,122 B2 | 3/2020 | Manohar et al. | |
| 10,971,215 B1 | 4/2021 | Yang et al. | |
| 2007/0101168 A1 | 5/2007 | Atkinson | |
| 2007/0186072 A1 | 8/2007 | Woo | |
| 2016/0364153 A1 * | 12/2016 | Nam | G06F 11/00 |
| 2018/0211696 A1 * | 7/2018 | Kim | G11C 7/1072 |
| 2018/0294031 A1 * | 10/2018 | Seo | G11C 16/10 |
| 2019/0004984 A1 * | 1/2019 | Lee | G06F 18/28 |
| 2019/0065116 A1 | 2/2019 | Sekine | |
| 2019/0080774 A1 * | 3/2019 | Lee | G11C 16/10 |
| 2019/0096470 A1 * | 3/2019 | Koshizuka | G11C 8/18 |
| 2020/0293198 A1 | 9/2020 | Anazawa | |
| 2022/0137870 A1 | 5/2022 | Yamamoto | |

* cited by examiner

*Primary Examiner* — Getente A Yimer
(74) *Attorney, Agent, or Firm* — Patterson + Sheridan, LLP

(57) ABSTRACT

The present disclosure generally relates to data storage devices, such as solid state drives (SSDs), and, more specifically, continuous data-transfer to and from a memory device of the data storage device. A data storage device includes a memory device and a controller coupled to the memory device. The controller is configured to indirectly delay the transfer without stopping toggling the DQS signals. The toggle mode (TM) speed is dynamically modified slowly during the transfer while considering the current level of the internal write buffer just before writing to the memory device. The transfer can now be accelerated or deaccelerated dynamically during the data transfer. The changes are done slowly so signal integrity issues are avoided.

15 Claims, 10 Drawing Sheets

500

600

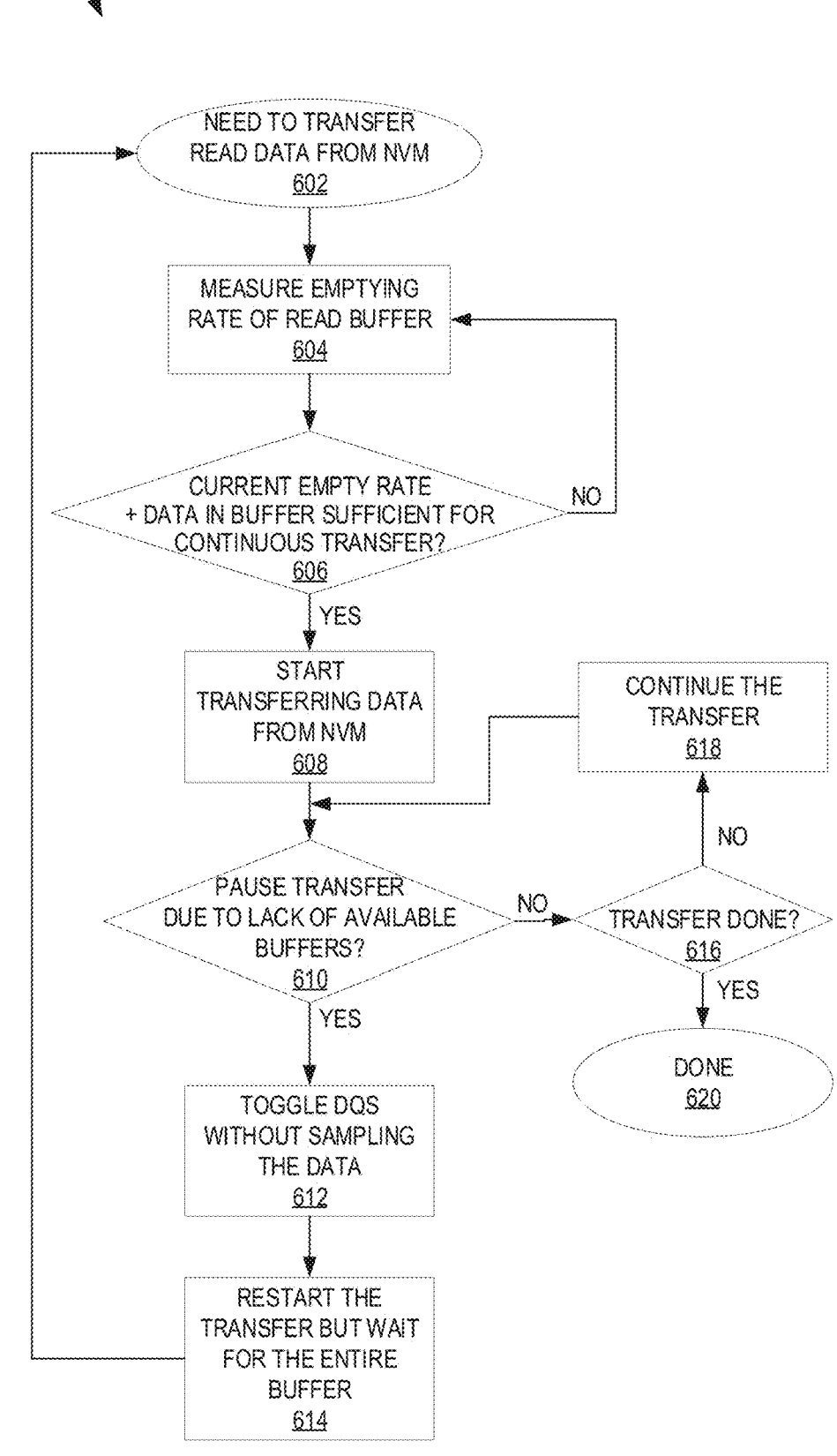

NEED TO TRANSFER
READ DATA FROM NVM
602

MEASURE EMPTYING
RATE OF READ BUFFER
604

CURRENT EMPTY RATE
+ DATA IN BUFFER SUFFICIENT FOR
CONTINUOUS TRANSFER?
606

NO

YES

START
TRANSFERRING DATA
FROM NVM
608

CONTINUE THE
TRANSFER
618

PAUSE TRANSFER
DUE TO LACK OF AVAILABLE
BUFFERS?
610

NO

TRANSFER DONE?
616

NO

YES

YES

TOGGLE DQS
WITHOUT SAMPLING
THE DATA
612

DONE
620

RESTART THE
TRANSFER BUT WAIT
FOR THE ENTIRE
BUFFER
614

Not allowed

DQS data pause

DQS no data pause

DQS data pause by TM dynamic change

CONTINUOUS NAND DATA-TRANSFER WITH DYNAMIC TM

CROSS-REFERENCE TO RELATED APPLICATION

This application is a continuation-in-part of U.S. patent application Ser. No. 17/492,175, filed Oct. 1, 2021. The aforementioned related patent application is herein incorporated by reference in its entirety.

BACKGROUND OF THE DISCLOSURE

Field of the Disclosure

Embodiments of the present disclosure generally relate to data storage devices, such as solid state drives (SSDs), and, more specifically, continuous data-transfer to and from a memory device of the data storage device.

Description of the Related Art

Data input or data output may be paused on a NAND interface by placing the data bus in an idle state. The pausing of data input may be completed by pausing DQS (DQS_t/DWS_c) and holding the relevant signal(s) static high or low until the data burst is resumed. The data burst may be paused if the DQS (DQS_t/DQS_c) or RE_n (RE_t/RE_c) is paused such that the current input/output frequency is not maintained for the data burst. WE_n is held high during data input and output burst pause time.

A controller of the data storage device could use the DQS signal in order to pause the data-transfer, but such an approach cannot be used in high toggle mode since the approach introduces signal integrity issues. In another approach, the controller may raise the ALE/CLE signals for pausing the transfer and then issue the warm up cycle to start sending the data again, but such an approach increases the overhead due to extra warm up cycles. In yet another approach, the controller incorporates bigger buffers in the read paths and the write paths, and the write buffer acts as a store and forward buffer. The write data is transferred to the NAND only holding the entire data in the buffer. The read data transfer is initiated only after allocating enough buffers that would be able to absorb the entire data. However, latency may be increased and extra system requirements may be needed due to the size of the buffers.

Therefore, there is a need the art for an improved data-transfer that is continuous.

SUMMARY OF THE DISCLOSURE

The present disclosure generally relates to data storage devices, such as solid state drives (SSDs), and, more specifically, continuous data-transfer to and from a memory device of the data storage device. A data storage device includes a memory device and a controller coupled to the memory device. The controller is configured to indirectly delay the transfer without stopping toggling the DQS signals. The toggle mode (TM) speed is dynamically modified slowly during the transfer while considering the current level of the internal write buffer just before writing to the memory device. The transfer can now be accelerated or deaccelerated dynamically during the data transfer. The changes are done slowly so signal integrity issues are avoided.

In one embodiment, a data storage device comprises: a memory device; and a controller coupled to the memory device, wherein the controller is configured to: determine a level of fullness of a write buffer; and adjust a toggle mode (TM) speed based upon the determining.

In another embodiment, a data storage device comprises: a memory device; and a controller coupled to the memory device, wherein the controller includes: a write buffer; a read buffer; and a flash interface module (FIM), wherein the FIM is coupled to the memory device, wherein the FIM is coupled to the write buffer, wherein the FIM is coupled to the read buffer, wherein includes a toggle mode (TM) adapter and a scheduler, and wherein the TM adapter is configured to adjust a data strobe signal (DQS) dynamically based upon fullness of either: the write buffer, the read buffer, or both.

In another embodiment, a data storage device comprises: memory means; and a controller coupled to the memory means, wherein the controller is configured to: dynamically adjust a data strobe signal (DQS) toggle mode (TM) pulse width in response to determining that a write buffer fullness threshold has been crossed, wherein the write buffer is distinct from the memory means.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 6 is a flow diagram illustrating a method of continuous data transfer from a memory device, according to certain embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, continuous data-transfer to and from a memory device of the data storage device. A data storage device includes a memory device and a controller coupled to the memory device. The controller is configured to indirectly delay the transfer without stopping toggling the DQS signals. The toggle mode (TM) speed is dynamically modified slowly during the transfer while considering the current level of the internal write buffer just before writing to the memory device. The transfer can now be accelerated or deaccelerated dynamically during the data transfer. The changes are done slowly so signal integrity issues are avoided.

Figure 1:
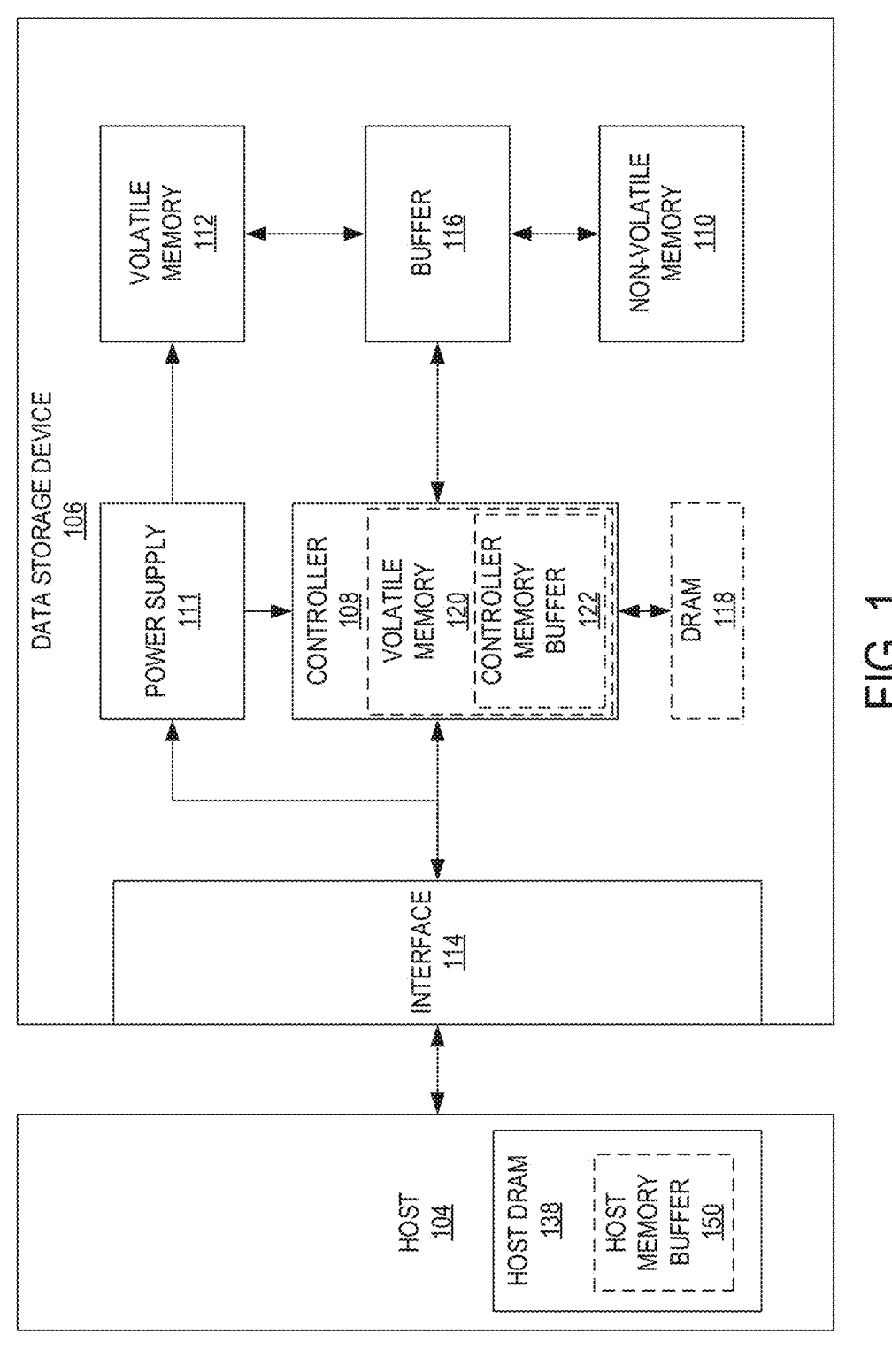
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where controller 108 accesses the CMB 122 in order to retrieve the stored generated commands and/or associated data.

Figure 2:
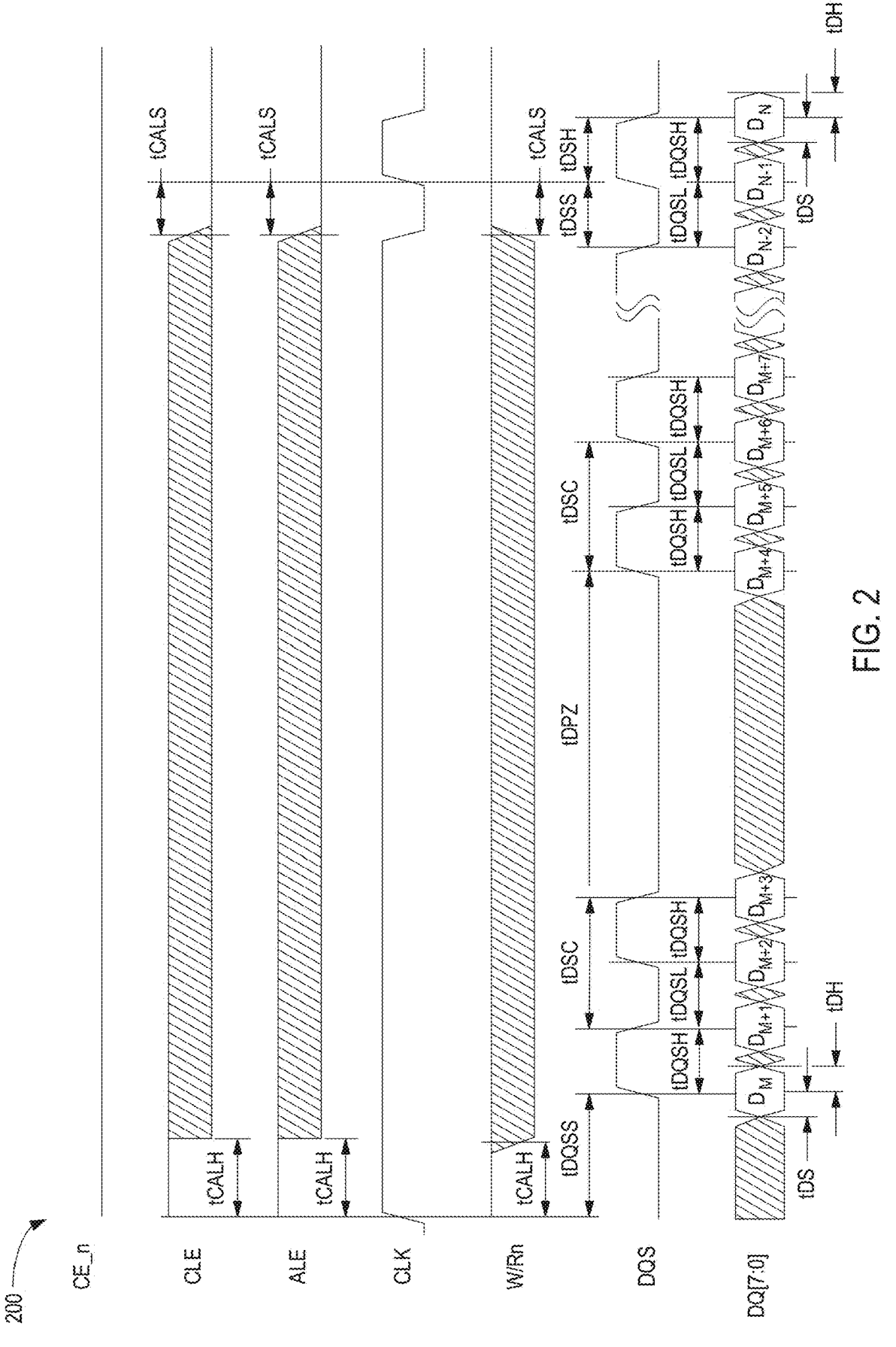
FIG. 2 is an illustration of an example data input cycle timing, according to certain embodiments.

FIG. 2 is an illustration of an example data input cycle timing 200, according to certain embodiments. The example data input cycle timing 200 includes a chip enable (CE_n) signal, a command latch enable (CLE) signal, an address latch enable (ALE) signal, a clock (CLK) signal, a write/read indication (W/R_n) signal, a data strobe (DQS) signal, and a data signal (DQ). The listed signals are not intended to be limiting, but to provide an example of a possible embodiment. It is to be understood that more or less signals are contemplated and may be applicable to the embodiments described herein. The example data input cycle timing 200 may be an example of a controller, such as the controller 108, sending signals to a memory device, such as the NVM 110 of FIG. 1, in order to read data from or write data to the NVM 110.

When the CE_n signal is asserted low, the controller 108 may be able to access the NVM 110. By asserting the CE_n signal low, the NVM 110 is able to accept data bytes written to the memory when a write enable (WE_n) signal is asserted low or enable output of data bytes when a read enable (RE_n) signal is asserted low. When the CE_n signal is asserted high, the NVM 110 ignores the RE_n signal and the WE_n signal. The CLE signal is used to send commands to the NVM 110 from the controller 108 when the CE_n signal is asserted low and the CLE signal is asserted low.

The ALE signal is used to latch an address associated with the CLE signal to a respective location in an address register, such as in a logical to physical (L2P) table, when the ALE signal is asserted low.

When the CLK signal is asserted high, data may be transferred to the NVM 110 or read from the NVM 110 back to the controller 108. The W/R_n signal may indicate that a write or a read is occurring to or from the NVM 110. The DQS signal is a clock signal that is toggled in order to drive the DQ signal. The DQ signal sends data to or from the NVM 110 when the DQS signal is toggled. During a write flow, the controller 108 controls drives the data on the DQ signal. During a read flow, the DQS signal and the data are driven by the NVM 110. The controller 108 may stop the DQS signal to stop sending the clock signal, which causes the DQ signal to pause, therefore pausing any data transfers. When working in a high toggle mode, where the DQS signal has a high frequency, pausing a data-transfer may cause signal integrity issues. Likewise, de-asserting the CLE signal and the ALE signal may cause an increase of overhead due to extra warm up cycles.

Figure 3:
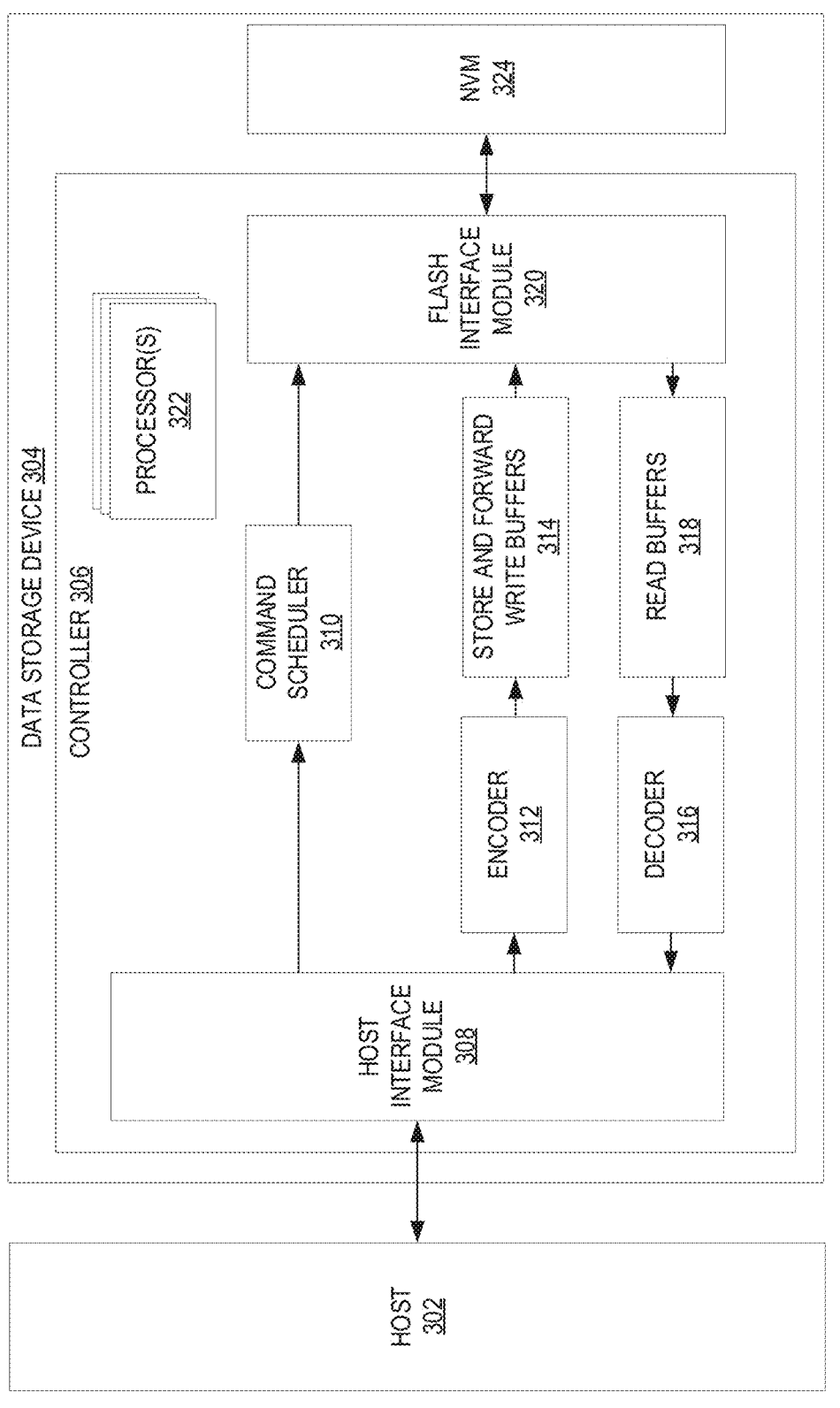
FIG. 3 is a schematic block diagram illustrating a storage system for reading data from and writing data to a memory device, according to certain embodiments.

FIG. 3 is a schematic block diagram illustrating a storage system 300 for reading data from and writing data to a memory device (i.e., an NVM 324), according to certain embodiments. Aspects of the storage system 300 may be similar to the storage system 100 of FIG. 1. The storage system 300 includes a host device 302 and a data storage device 304. It is to be understood that the storage system 300 may include additional components/elements not shown for simplification purposes.

The data storage device 304 includes a controller 306 and an NVM 324. The host device 302 is coupled to a host interface module (HIM) 308 of the controller 306, where HIM 308 is configured to receive or fetch commands and data from the host device 302 and transfer data and messages (e.g., completion messages, interrupt messages, failure messages, etc.) corresponding to executed commands back to the host device 302. The controller 306 further includes one or more processors 322, a command scheduler 310, an encoder unit 312, one or more store and forward write buffers 314, a decoder unit 316, one or more read buffers 318, and a flash interface module (FIM) 320.

The one or more processors 322 provide instructions and processing (e.g., computational) power in order to execute commands and logic. When a command is received at the HIM 308, the command is transferred to the command scheduler 310. The one or more processors 322 may process the command to determine what type of command was received. Based on the processing, instructions may be generated to a data path in order to process the data at the encoder unit 312 for a write command or at the decoder unit 316 for a read command.

For example, data associated with the write command is sent from the HIM 308 to the encoder unit 312, where the encoder unit 312 encodes the write command data. Encoding the write command data may include generating error correction code, parity data, low-density parity-check data, and the like as well as encrypting the write command data. The encoded data is passed from the encoder unit 312 to the store and forward write buffers 314. Encoded data is stored in the store and forward write buffers 314 and transferred to the NVM 324 when the entire data is present in the store and forward write buffers 314. Because the transfer is initiated once the entire data is present in the store and forward write buffers 314, the store and forward write buffers 314 may need to have a large total capacity since the buffer needs to hold the entire data transfer data.

In another example, data associated with the read command is retrieved by the FIM 320 from a respective location in the NVM 324, the read command data is stored in the read buffers 318. The decoder unit 316 receives the stored read command data and decodes the read command data. The decoding may determine if the data has any bit errors, attempt to correct the bit errors, and provide an indication of whether the decoding passed or failed to the HIM 308 to provide to the host device 302.

Figure 4:
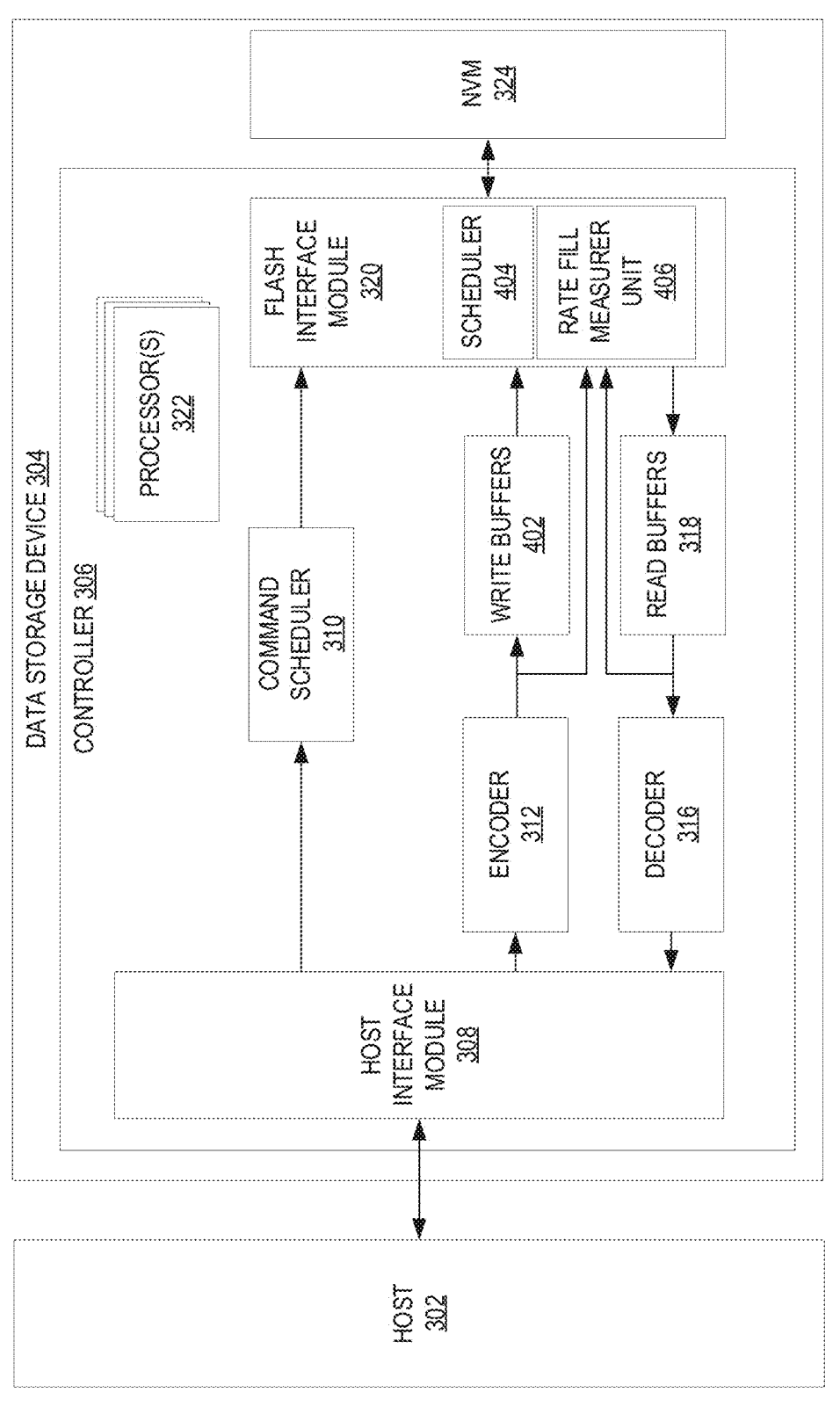
FIG. 4 is a schematic block diagram illustrating the storage system of FIG. 3 having continuous data-transfer, according to certain embodiments.

FIG. 4 is a schematic block diagram illustrating the storage system 300 of FIG. 3 having continuous data-transfer, according to certain embodiments. Rather than including store and forward write buffers 314, the controller 306 includes write buffers 402. Furthermore, the FIM 320 includes a scheduler 404 and a rate fill measurer unit 406. After data is encoded by the encoder unit 312 and passed to the write buffers 402, information regarding the amount of data being sent to the write buffers 402 is forwarded to the rate fill measurer unit 406. Likewise, when data is retrieved from the NVM 324 and passed from the read buffers 318 to the decoder unit 316, information regarding the amount of data being sent from the read buffers 318 is forwarded to the rate fill measurer unit 406. It is to be understood that while the plural buffer is utilized, a singular buffer, such as a write buffer and a read buffer, may be applicable in the embodiments described.

The rate fill measurer unit 406 may determine whether the fill rate of the write buffers 402 and the amount of data held in the write buffers 402 or the emptying rate of the read buffers 318 and the amount of data held in the read buffers 318 is sufficient to maintain a continuous data transfer. The scheduler 404 utilizes the information and determination by the rate fill measurer unit 406 to schedule writes to the NVM 324 or reads from the NVM 324. The scheduler 404 may fine-tune the data transfer based on the emptying/filling rate and the amount of data held in each respective buffer 402, 318 in order to avoid pausing the data transfer after the data transfer has started. For example, when the scheduler 404 determines that the fill rate of the write buffers 402 is not sufficient to maintain continuous data transfer, the scheduler 404 may schedule garbage data writes to the NVM 324 during times that the write buffers 402 is refilled. Afterwards, the correct encoded data is then written to the NVM 324. In another example, when the scheduler 404 determines that the emptying rate of the read buffers 318 is not sufficient to maintain continues data transfer (i.e., the replenish rate is not sufficient), the scheduler 404 may still provide the read data, but instruct the controller 306 to not sample the read data. Afterwards, the scheduler 404 may schedule the read operation again to read the data form the NVM 324. Thus, the scheduler 404 may determine a timing of whether to send garbage data in lieu of user data to the NVM 324 or read data from the NVM 324 without sampling the data read.

In some examples, the rate fill measurer unit 406 may also determine a fullness of the write buffers 402 and the read buffers 318, where the scheduler 404 may utilize a combination of the fullness and the fill rate/emptying rate to determine when to send garbage data or instruct the controller 306 to not sample the data. In other examples, the scheduler may pre-emptively stop sending data and send garbage data or instruct the controller 306 to not sample the data prior to the write buffers 402 or the read buffers 318 emptying. For example, the pre-emptive aspect may be initiated a threshold level of the write buffers 402 or the read buffers 318. The threshold level may be a data amount equal to a value chosen based on a toggle mode (e.g., speed of the interface and filling/emptying rate of relevant buffers). In some scenarios, the data transfer starts after having only 10% of the entire page held internally in the write buffers 402, such as in a low toggle mode scenario. In other scenarios, the data transfer starts after having only 70% of the entire page held internally in the write buffers 402, such as in a high toggle mode scenario. In one example, if the write buffers 402 become empty or are about to become empty, then the scheduler 404 may stop data transfer and start sending garbage data. Thus, increasing the data being transferred on the NVM interface. Likewise, when the scheduler 404 determines that the amount of data in the write buffers 402 or the read buffers 318 is greater than some threshold and the user data transfer is paused, such that garbage data is being transferred, the scheduler 404 stops the garbage data transfer and restarts the user data transfer without changing the ALE/CLE signals and the DQS signal.

The swap between data transfer and sending garbage data may be seamless or close to seamless, such that the data transfer (referring to the DQS signal, the ALE/CLE signals, and other relevant signals that are paused when data transfer is paused) is not paused. For example, referring back to FIG. 2, the CLE/ALE signals remain asserted low and the DQS signal continues to toggle between high and low when the data transfer swaps from sending write data (e.g., user/host data) to sending garbage data. Therefore, latencies and inefficiencies associated with pausing data transfers may not be realized or relevant.

Figure 5:
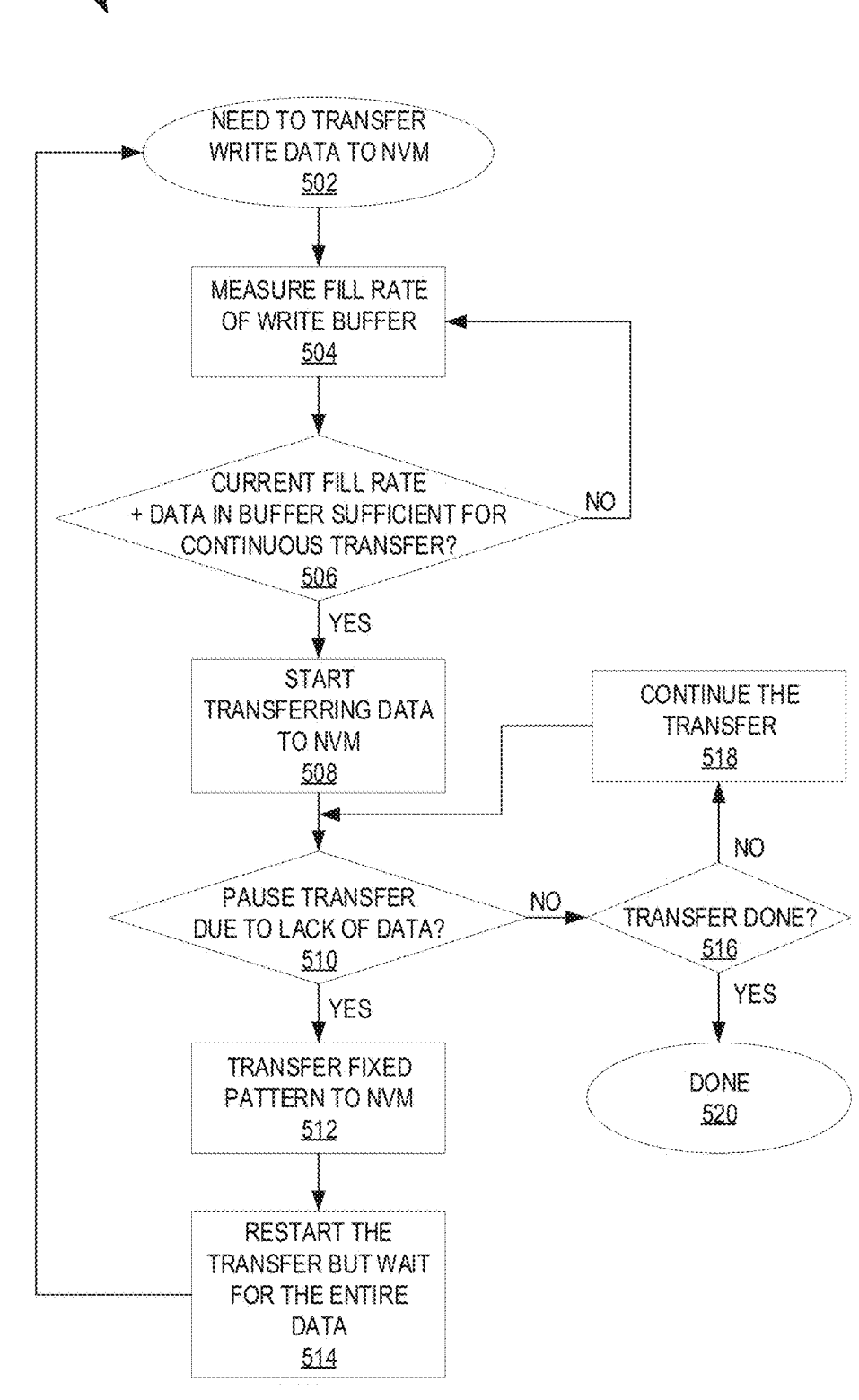
FIG. 5 is a flow diagram illustrating a method of continuous data-transfer to a memory device, according to certain embodiments.

FIG. 5 is a flow diagram illustrating a method 500 of continuous data-transfer to a memory device, such as the NVM 324 of FIG. 3, according to certain embodiments. Method 500 may be implemented by a controller, such as the controller 306 of FIG. 4. References to aspects of FIG. 4 may be utilized for exemplary purposes.

At block 502, the controller 306 determines that there is a need to transfer data to the NVM 324. For example, the need to transfer data may be due to the controller 306 receiving a write command from the host device 302. At block 504, the rate fill measurer unit 406 determines a fill rate of the write buffers 402. At block 506, the scheduler 404 determines if the fill rate of the write buffers 402 at block 504 and a current amount of data in the write buffers 402 is sufficient for continuous data transfer. If the fill rate of the write buffer 402 at block 504 and a current amount of data in the write buffers 402 is not sufficient for continuous data transfer at block 506, the method 500 returns to block 504.

However, if the fill rate of the write buffer 402 at block 504 and a current amount of data in the write buffers 402 is sufficient for continuous data transfer at block 506, then at block 508 the scheduler 404 starts transferring data stored in the write buffers 402 to the NVM 324. At block 510, the scheduler 404 determines if the data transfer needs to be paused due to a lack of data in the write buffers 402. If the data transfer does not need to be paused at block 510, then the scheduler 404 determines if the data transfer has completed at block 516. If the data transfer is completed at block 516, then method 500 is completed at block 520. However, if the data transfer is not completed at block 516, then the controller 306 continues the transfer of data from the write buffers 402 to the NVM 324 at block 518.

If the data transfer needs to be paused due to a lack of data in the write buffers 402 at block 510, then the scheduler 404 transfers a fixed pattern to the NVM 324 at block 512. The fixed pattern may be garbage data. At block 514, the scheduler 404 waits the entire data to be received at the write buffers 402 before restarting the data transfer of non-garbage data.

FIG. 6 is a flow diagram illustrating a method 600 of continuous data transfer from a memory device, such as the NVM 324 of FIG. 3, according to certain embodiments. Method 600 may be implemented by a controller, such as the controller 306 of FIG. 4. References to aspects of FIG. 4 may be utilized for exemplary purposes.

At block 602, the controller 306 determines that there is a need to transfer data from the NVM 324. For example, the need to transfer data may be due to the controller 306 receiving a read command from the host device 302. At block 604, the rate fill measurer unit 406 determines an emptying rate of the read buffers 318. At block 606, the scheduler 404 determines if the emptying rate of the read buffers 318 at block 604 and a current amount of data in the read buffers 318 is sufficient for continuous data transfer. If the emptying rate of the read buffer 318 at block 604 and a current amount of data in the read buffers 318 is not sufficient for continuous data transfer at block 606, the method 600 returns to block 604.

However, if the emptying rate of the read buffer 318 at block 604 and a current amount of data in the read buffers 318 is sufficient for continuous data transfer at block 606, then at block 608 the scheduler 404 starts transferring data stored in the NVM 324 to the read buffers 318. At block 610, the scheduler 404 determines if the data transfer needs to be paused due to a lack of available buffers of the read buffers 318. If the data transfer does not need to be paused at block 610, then the scheduler 404 determines if the data transfer has completed at block 616. If the data transfer is completed at block 616, then method 600 is completed at block 620. However, if the data transfer is not completed at block 616, then the controller 306 continues the transfer of data from the NVM 324 to the read buffers 318 at block 618.

If the data transfer needs to be paused due to a lack of data in the read buffers 318 at block 610, then the NVM 324 continues to toggle the DQS and the controller 306 does not sample the data from the NVM 324 at block 612. At block 614, the scheduler 404 waits the entire data to be received at the read buffers 418 before restarting the data transfer of data from the NVM 324, where the read data is sampled when the data transfer is restarted.

The idea that the device controller evaluates what is the correct timing for starting the transfer based on the filling/emptying rate of the buffers and the current state of the buffers is discussed. The, the transfer starts even before having the data internally in the write flow of the allocated buffers in the read flow. If, in the middle of the transfer, the transfer must be stopped due to a lack of data/buffers, the transfer to the memory device is not paused. The transfer to the memory device will continue normally while ignoring the data. Later, the transfer is restarted.

The disclosure herein addresses the problem of signal integrity while using the temporary pause features discussed above. When working in high TM, pausing the data transfer may lead to signal integrity issues. In order to avoid signal integrity issues, there is a desire to not pause the data transfer using the DQS signal. As discussed herein, the idea of having continuous data transfer without increasing internal buffer sizes in the device controller and without increasing latency while accessing the memory device is achieved.

As discussed herein, a mechanism is disclosed that is able to indirectly delay the transfer of data without stopping toggling the DQS signal. The idea is that the toggle mode speed is dynamically modified slowly during transfer while considering the current level of the internal write buffer (just before writing to the NAND). In such a manner, the transfer could be accelerated or decelerated dynamically during the data transfer. The changes are done slowly so signal integrity issues are avoided. The dynamic modifying can be utilized on top of the options discussed in relation to FIGS. 5 and 6.

Figure 7:
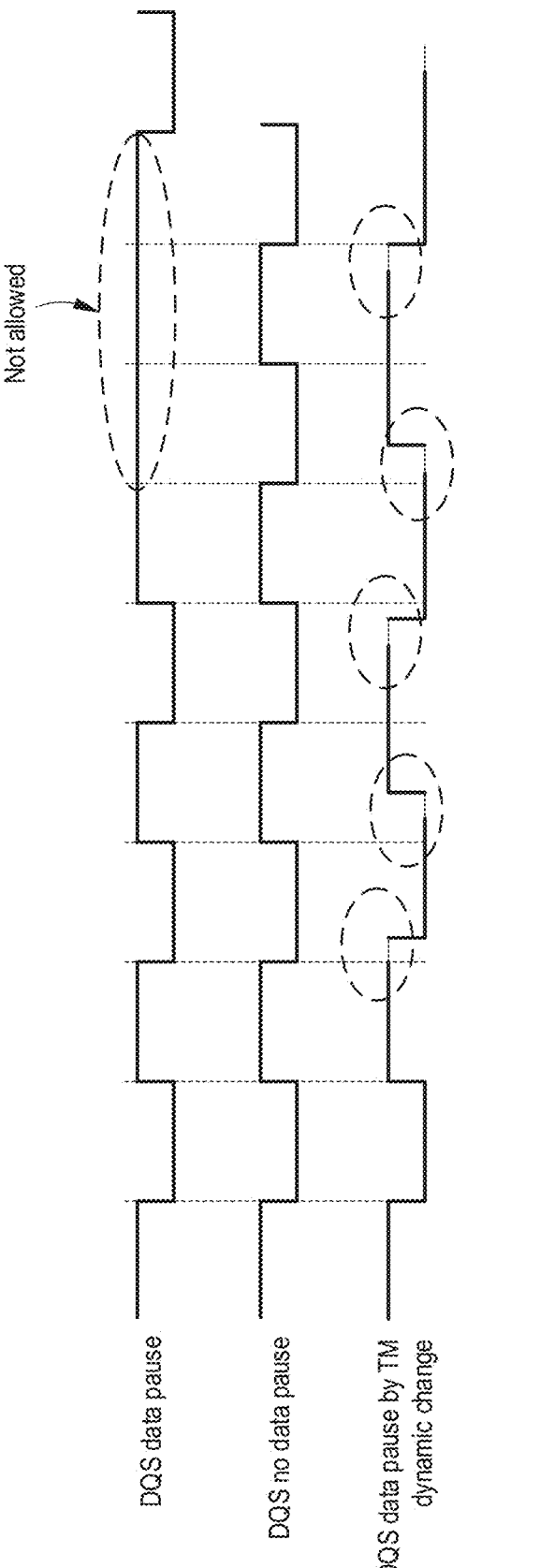
FIG. 7 is an illustration of a DQS data pause, according to certain embodiments.

FIG. 7 is an illustration of a DQS data pause 700, according to certain embodiments. In addition, FIG. 7 depicts the concept of causing a delay in the data-transfer by adaptively changing the toggle mode speed during the data-transfer considering the current level of the write buffer. For example a DQS is shown having data pause during the transfer. The method may lead to signal integrity issues while working in high TM speed and therefore should be avoided. In another example a DQS with no data pause is shown, which is the ideal scenario, but in the example the device controller will not be able to pause or delay the data-transfer. A DQS data pause by dynamic and slow change in TM is also shown. When the device controller needs to slow down the data-transfer, the device controller lowers the TM speed gradually to increase the width of the pulses slightly each and every cycle. The gradual TM speed change causes the signal integrity issue to be avoided.

In previous approaches the device controller would opt to pause the DQS. Pausing the DQS should be avoided at all times to ensure optimal performance. A better approach is to adjust the TM speed based on the buffer capacity. The DQS is slowed down when the data is low in the buffer. The DQS is sped up when the data is high in the buffer.

Figure 8:
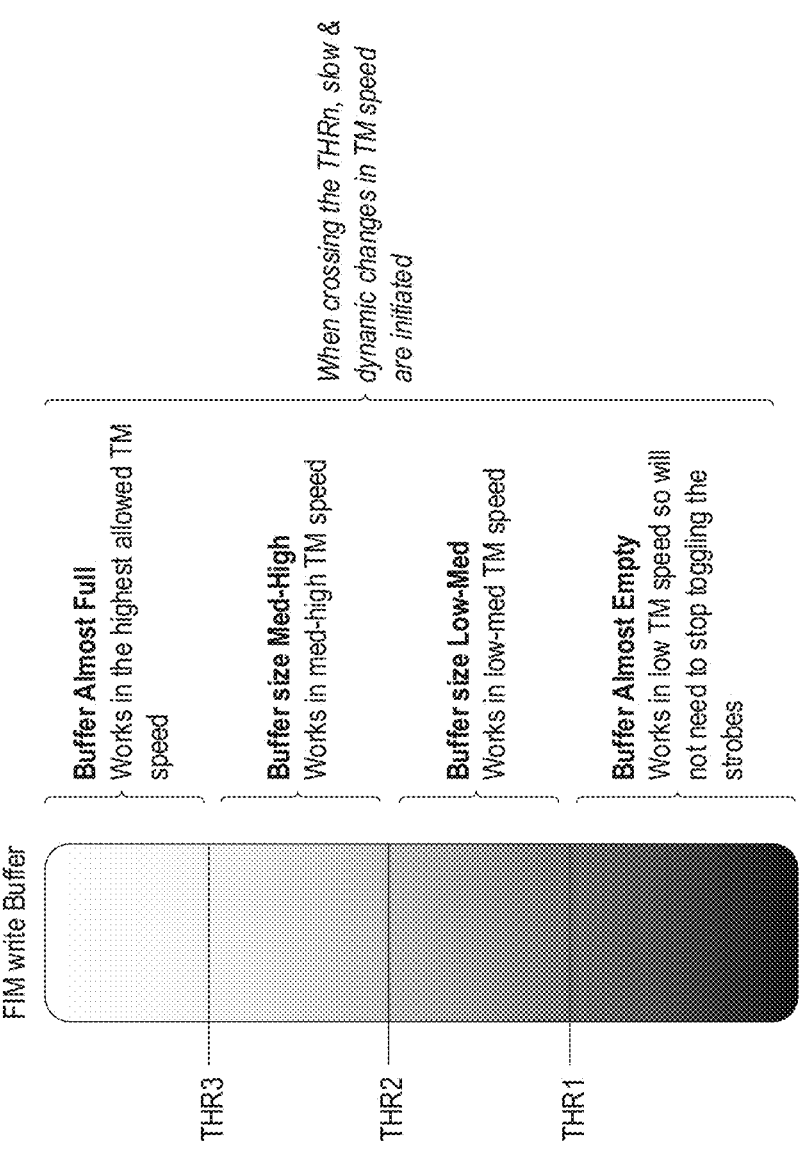
FIG. 8 is an illustration of FIM write buffer thresholds, according to certain embodiments.

FIG. 8 is a diagram 800 illustrating FIM write buffer thresholds, according to certain embodiments. It is to be understood that while three thresholds and four TM speeds have been shown, more or less thresholds and TM speeds may be present. Diagram 800 shows a write buffer that holds data before writing the data to the NAND. In the current example, three different thresholds are defined. When crossing a threshold, the TM speed is adaptively and gradually changed so the write buffer underrun will never happen. The motivation, again, is to avoid pausing the NAND interface.

The three different thresholds in the current example are labeled as THR1, THR2, and THR3. Before the device reaches THR1, the buffer is almost empty. When a buffer is almost empty the buffer is able to receive more data. When the buffer is almost empty the device works at a low TM. The low TM speed will avoid the need to stop toggling the strobes. Before the device reaches THR2, the buffer size is in a range from low-medium in size of space filled. When the buffer is past THR1 but before reaching THR2 the device works at a low-medium TM speed. Before the device reaches THR3, the buffer size is in a range from medium-high in size of space filled. When the buffer is past THR2 but before reaching THR3 the device works at a medium-high TM speed. The speed is used to account for the buffer becoming closer to being filled with data. After the device reaches THR3, the buffer size is almost filled. When the buffer is almost filled then there is not a lot of space left in the buffer to receive data. Since there is low space, when the buffer is past THR3 the device works at the highest possible TM speed. At the points when the threshold of THR1, THR2, and THR3 are crossed the device initiates making slow and dynamic changes in the TM speed.

Figure 9:
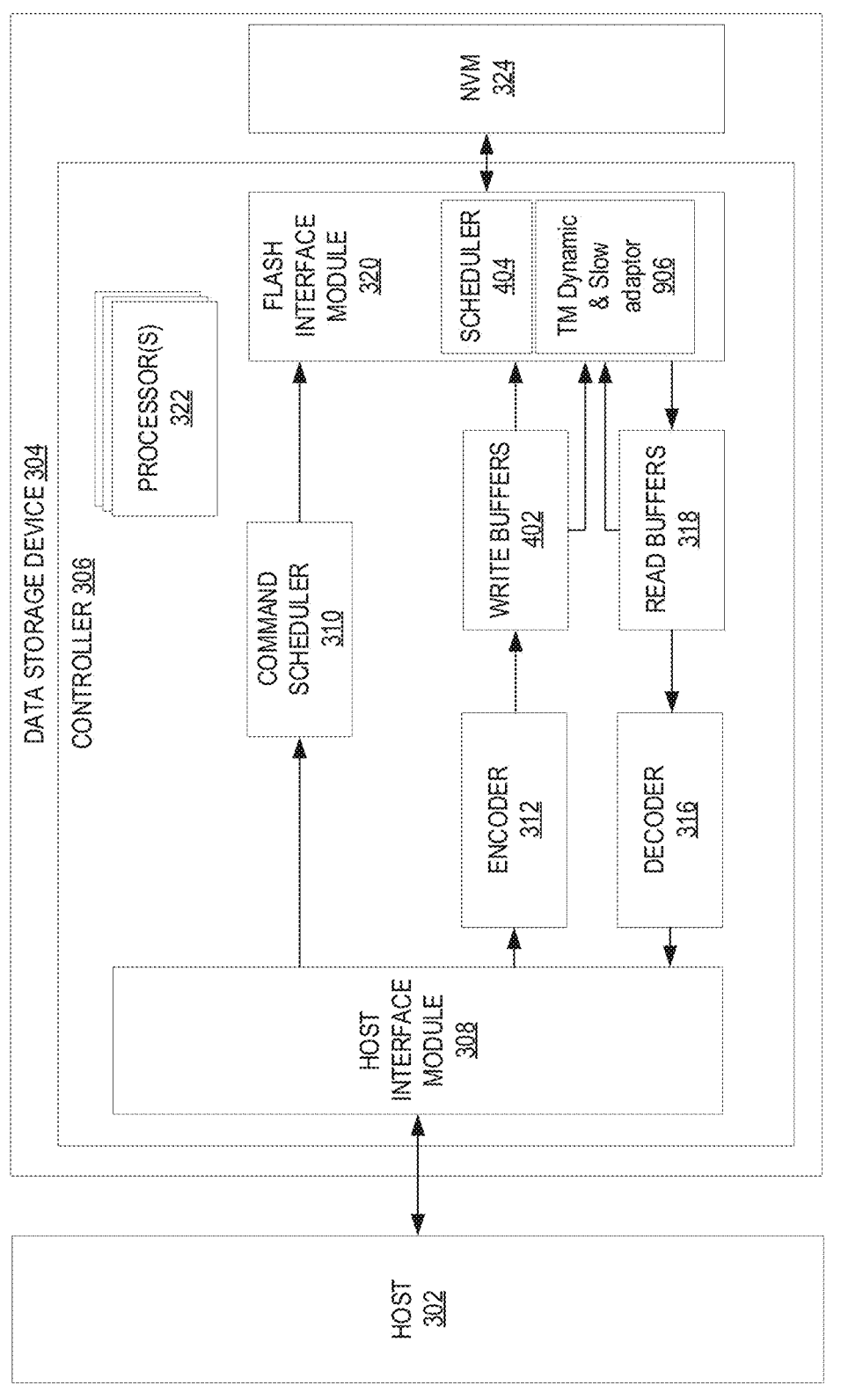
FIG. 9 is a schematic block diagram illustrating the storage system of FIG. 4 having continuous data-transfer, according to certain embodiments.

FIG. 9 is a schematic block diagram 900 illustrating the storage system of FIG. 4 having continuous data-transfer, according to certain embodiments. In diagram 900, small read and write buffers are implemented. The write buffer is not a store and forward buffer. The FIM 320 incorporates a TM dynamic and slow adaptor 906 that is responsible for changing the TM speed dynamically during the transfer by considering the current level of the write buffer. Based on the current state of the buffer, the logic decides when to initiate TM speed change.

Based upon the rate and current state of a buffer, the logic decides when to start the transfer. If in the middle of the transfer, the transfer must be stopped due to lack of buffers, the transfer to the memory device is not paused. Instead, in a write path, garbage data is written to the memory device (e.g., NAND) and later the correct data will be transferred again to the memory device. In a read path, the data is transferred but not sampled by the device controller. Later, the read operation is issued again.

The TM speed can be dynamically modified slowly during the transfer while considering the current level of the internal write buffer (just before writing to the NAND). The transfer now can be accelerated or deaccelerated dynamically during the data transfer. By implementing alternative techniques in lieu of sending user data when data transfer needs to be paused due to a lack of data, the overall data storage device performance may be improved.

Figure 10:
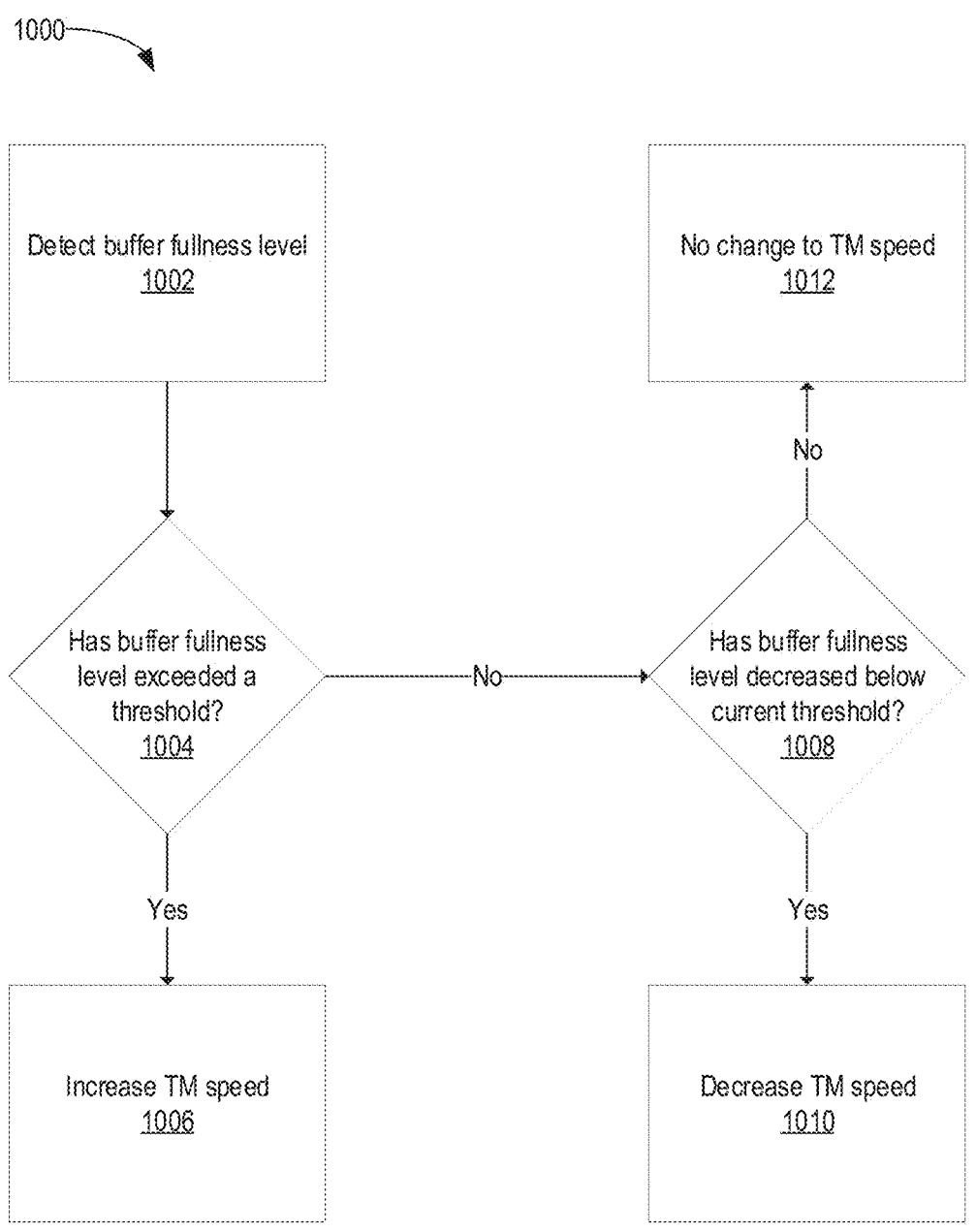
FIG. 10 is a flow chart illustrating continuous data transfer, according to certain embodiments.

FIG. 10 is a flow chart 1000 illustrating continuous data transfer, according to certain embodiments. Flow chart 1000 illustrates a method to a write buffer that holds data before writing the data to the NAND. When crossing a threshold, the TM speed is adaptively and gradually changed so the write buffer underrun will never happen. The motivation, again, is to avoid pausing the NAND interface.

At block 1002, method detects a buffer fullness level. At block 1004, method determines whether the buffer level exceed a threshold. All buffers have a threshold when in operation. If the answer to block 1004 is yes, then the method will increase the TM speed at block 1006. If the answer to block 1004 is no then the method will proceed to block 1008. At block 1008, the method determines whether the buffer fullness level decreased below current threshold. If the answer to block 1008 is yes then the method will decrease the TM speed at block 1010. If the answer to block 1008 is no then the TM speed will not be changed at block 1012. It is to be understood that while in method 1000 block 1004 is executed before block 1008, block 1008 can be executed before block 1004.

The main advantage of the disclosure is having the continuous data-transfer over the NAND interface without increasing the latency and the required extra buffers. The continuous data-transfer allows the device to support the latest NAND technologies without increasing the latency. Also continuous data-transfer avoids being exposed to possible signal integrity issues when working in high toggle mode.

In one embodiment, a data storage device comprises: a memory device; and a controller coupled to the memory device, wherein the controller is configured to: determine a level of fullness of a write buffer; and adjust a toggle mode (TM) speed based upon the determining. The adjusting comprises adjusting the TM speed by an amount of between about 1 percent and about 10 percent. The adjusting is performed dynamically. Adjusting a TM speed comprises changing a pulse width of a data strobe (DQS) signal. The adjusting comprises gradually changing the TM speed. The adjusting is performed within a flash interface module (FIM) by a toggle mode adapter coupled to the write buffer. The FIM also comprises a scheduler. The adjusting occurs during data transfer. The controller is further configured to write garbage data to the memory device when the write buffer is empty. The write buffer has fullness thresholds and wherein the adjusting occurs in response to fullness crossing a threshold.

In another embodiment, a data storage device comprises: a memory device; and a controller coupled to the memory device, wherein the controller includes: a write buffer; a read buffer; and a flash interface module (FIM), wherein the FIM is coupled to the memory device, wherein the FIM is coupled to the write buffer, wherein the FIM is coupled to the read buffer, wherein includes a toggle mode (TM) adapter and a scheduler, and wherein the TM adapter is configured to adjust a data strobe signal (DQS) dynamically based upon fullness of either: the write buffer, the read buffer, or both. The adapter is configured to ensure write buffer does not empty by adjusting TM speed. Adjusting the DQS dynamically comprises increasing or decreasing a pulse width of the DQS. The adjusting comprises changing the pulse width by a predetermined amount. Two consecutive pulses having different pulse widths. The controller is configured to transfer data in a read path without sampling the data. The TM adapter is configured to dynamically adjust the DQS during data transfer.

In another embodiment, a data storage device comprises: memory means; and a controller coupled to the memory means, wherein the controller is configured to: dynamically adjust a data strobe signal (DQS) toggle mode (TM) pulse width in response to determining that a write buffer fullness threshold has been crossed, wherein the write buffer is distinct from the memory means. The dynamically adjusting comprises decreasing TM pulse width. When the write buffer is empty, the controller writes garbage data to the memory means.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
determine a level of fullness of a write buffer, wherein the determining comprises determining whether the write buffer has exceeded a buffer fullness level threshold of encoded write command data;
determine a filling/emptying rate of the write buffer;
adjust a toggle mode (TM) speed based upon the determining, wherein adjusting a TM speed comprises changing a pulse width of a data strobe (DQS) signal based on a speed of the filling/emptying rate of the write buffer, wherein the adjusting occurs during data transfer;
when a fill rate of the write buffer is determined to be insufficient to maintain a continuous data transfer, schedule garbage data writes to the memory device; and
write garbage data to the memory device when the write buffer is empty.

2. The data storage device of claim 1, wherein the adjusting comprises adjusting the TM speed by an amount of between about 1 percent and about 10 percent.

3. The data storage device of claim 1, wherein the adjusting is performed dynamically.

4. The data storage device of claim 1, wherein the adjusting comprises gradually changing the TM speed.

5. The data storage device of claim 1, wherein the adjusting is performed within a flash interface module (FIM) by a toggle mode adapter coupled to the write buffer.

6. The data storage device of claim 5, wherein the FIM also comprises a scheduler.

7. The data storage device of claim 1, wherein the write buffer has fullness thresholds.

8. A data storage device, comprising:
a memory device; and
a controller coupled to the memory device, wherein the controller includes:
a write buffer;
a read buffer; and
a flash interface module (FIM), wherein:
the FIM is coupled to the memory device,
the FIM is coupled to the write buffer,
the FIM is coupled to the read buffer,
the FIM includes a toggle mode (TM) adapter and a scheduler, and
the TM adapter is configured to adjust a data strobe signal (DQS) dynamically based upon fullness of either: the write buffer, the read buffer, or both, and upon a speed of a filling/emptying rate of the write buffer, the read buffer, or both,
adjusting the DQS dynamically comprises increasing or decreasing a pulse width of the DQS,
the adjusting is based upon determining whether the write buffer has exceeded a buffer fullness level threshold of encoded write command data,
the TM adapter is configured to dynamically adjust the DQS during data transfer,
when a fill rate of the write buffer is determined to be insufficient to maintain a continuous data transfer, the controller is configured to schedule garbage data writes to the memory device,
when an empty rate of the read buffer is determined to be insufficient to maintain a continuous data transfer, the controller is configured to pause sampling data, and
the controller is configured to write garbage data to the memory device when the write buffer is empty.

9. The data storage device of claim 8, wherein the adapter is configured to ensure write buffer does not empty by adjusting TM speed.

10. The data storage device of claim 8, wherein the adjusting comprises changing the pulse width by a predetermined amount.

11. The data storage device of claim 10, wherein two consecutive pulses having different pulse widths.

12. The data storage device of claim 8, wherein the controller is configured to transfer data in a read path without sampling the data.

13. A data storage device, comprising:
memory means; and
a controller coupled to the memory means, wherein the controller is configured to:
determine a filling/emptying rate of a write buffer;
dynamically adjust a data strobe signal (DQS) toggle mode (TM) pulse width in response to determining that the write buffer fullness threshold of encoded write command data has been crossed and based on a speed of the filling/emptying rate of the write buffer, wherein the write buffer is distinct from the memory means, wherein the adjusting occurs during data transfer;
when a fill rate of the write buffer is determined to be insufficient to maintain a continuous data transfer, schedule garbage data writes to the memory means; and write garbage data to the memory means when the write buffer is empty.

14. The data storage device of claim 13, wherein the dynamically adjusting comprises decreasing TM pulse width.

15. The data storage device of claim 13, wherein when the write buffer is empty, the controller writes garbage data to the memory means.

\* \* \* \* \*